US010165647B2

(12) United States Patent
Clark et al.

(10) Patent No.: US 10,165,647 B2
(45) Date of Patent: Dec. 25, 2018

(54) LIGHTING FIXTURE

(71) Applicant: Hubbell Incorporated, Shelton, CT (US)

(72) Inventors: Adam J. Clark, Bradenton, FL (US); Perry Romano, Bradenton, FL (US); Ormand Gilbert Anderson, Jr., Greenville, SC (US)

(73) Assignee: Hubbell Incorporated, Shelton, CT (US)

(*) Notice: Subject to any disclaimer, the term of this patent is extended or adjusted under 35 U.S.C. 154(b) by 0 days.

(21) Appl. No.: 15/493,627

(22) Filed: Apr. 21, 2017

(65) Prior Publication Data

US 2017/0307197 A1 Oct. 26, 2017

Related U.S. Application Data

(60) Provisional application No. 62/326,126, filed on Apr. 22, 2016.

(51) Int. Cl.

| | |
|---|---|
| ***B60Q 1/06*** | (2006.01) |
| ***F21V 29/00*** | (2015.01) |
| ***H05B 33/08*** | (2006.01) |
| ***F21V 17/10*** | (2006.01) |
| ***F21S 8/08*** | (2006.01) |
| ***F21V 23/02*** | (2006.01) |
| ***F21V 29/76*** | (2015.01) |
| *F21Y 115/10* | (2016.01) |
| *F21V 23/04* | (2006.01) |
| *F21W 131/103* | (2006.01) |
| *F21Y 105/10* | (2016.01) |

(52) U.S. Cl.
CPC ............ *H05B 33/089* (2013.01); *F21S 8/086* (2013.01); *F21V 17/10* (2013.01); *F21V 23/023* (2013.01); *F21V 29/763* (2015.01); *H05B 33/0803* (2013.01); *F21V 23/045* (2013.01); *F21V 23/0464* (2013.01); *F21V 23/0471* (2013.01); *F21W 2131/103* (2013.01); *F21Y 2105/10* (2016.08); *F21Y 2115/10* (2016.08)

(58) Field of Classification Search
CPC ..... F21V 17/10–17/20; F21V 23/003–23/006; F21V 23/009; F21V 23/02; F21V 23/023; F21V 23/026; F21V 29/74–29/777; H05B 33/089; H05B 33/0896
USPC ............... 362/249.02, 311.02, 373, 431, 800
See application file for complete search history.

(56) References Cited

U.S. PATENT DOCUMENTS 5,848,054 A 12/1998 Mosebrook et al.
6,078,148 A 6/2000 Hochstein
(Continued)

*Primary Examiner* — Jason M Han
(74) *Attorney, Agent, or Firm* — Dority & Manning, P.A.

(57) ABSTRACT

Lighting fixtures are provided. In one example implementation, a lighting fixture can include a housing, one or more drivers, and means for securing the one or more drivers to the housing to decrease thermal resistance between one or more of the drivers and the housing. The lighting fixture can also include an LED system comprising a light engine having a plurality of LED devices. The plurality of LED devices can be arranged on an LED board of the light engine such that a first portion of the LED board has a first density of LED devices and a second portion of the LED board has a second density of LED devices. The first density can be different than the second density.

17 Claims, 6 Drawing Sheets

(56) References Cited

U.S. PATENT DOCUMENTS

| | | | | |
|---|---|---|---|---|
| 6,990,394 | B2 | 1/2006 | Pasternak | |
| 8,100,552 | B2 | 1/2012 | Spero | |
| 8,319,452 | B1 | 11/2012 | Hamel et al. | |
| 8,432,108 | B2 | 4/2013 | Kelly et al. | |
| 8,491,159 | B2 | 7/2013 | Recker et al. | |
| 9,210,759 | B2 | 12/2015 | Reed | |
| 9,523,491 | B2 | 12/2016 | Bailey et al. | |
| 9,890,931 | B2 | 2/2018 | Clark | |
| 2007/0109795 | A1* | 5/2007 | Gabrius | F21S 8/031 362/373 |
| 2010/0172131 | A1* | 7/2010 | Mo | F21V 11/04 362/234 |
| 2015/0351205 | A1 | 12/2015 | Clark et al. | |
| 2016/0320044 | A1 | 11/2016 | Romano et al. | |
| 2016/0323981 | A1 | 11/2016 | Clark et al. | |

* cited by examiner

LIGHTING FIXTURE

PRIORITY CLAIM

The present application claims the benefit of priority of U.S. Provisional Application Ser. No. 62/326,126, titled "Lighting Fixture," filed on Apr. 22, 2016, which is incorporated herein by reference.

FIELD

The present disclosure relates generally to lighting fixtures.

BACKGROUND

Lighting fixtures (e.g., luminaires) using light emitting diodes (LEDs) have in recent years become somewhat practical and continue to penetrate the lighting market due to the increased luminous efficacy of commercially available LED components. LED luminaires are desirable as they offer customers energy savings due to good luminous efficacy combined with the ability to precisely control light distribution patterns, which is of particular importance for certain lighting scenarios, such as outdoor environments, and open environments, such as parking garages and canopies. Electrical components for powering and controlling LED luminaires are typically contained within an associated housing. During operation, heat is often produced by the electrical components that may be detrimental to the function of the lighting fixture.

SUMMARY

Aspects and advantages of embodiments of the present disclosure will be set forth in part in the following description, or may be learned from the description, or may be learned through practice of the embodiments.

One example aspect of the present disclosure is directed to a lighting fixture having a housing, one or more drivers, and a clamp bar. The clamp bar can be attachable to the housing and can be positioned adjacent to the one or more drivers to decrease thermal resistance between the one or more drivers and the housing.

Another example aspect of the present disclosure is directed to a lighting fixture having a housing and an LED system having a light engine. The light engine can include a plurality of LED devices. The plurality of LED devices can be arranged on an LED board of the light engine such that a first portion (e.g. a peripheral portion) of the LED board has a first density of LED devices and a second portion (e.g. a center portion) of the LED board has a second density of LED devices. The first density can be different from the second density.

Other example aspects of the present disclosure are directed to lighting systems, light engines, lighting circuits, lighting fixtures, devices, methods, and apparatuses according to example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
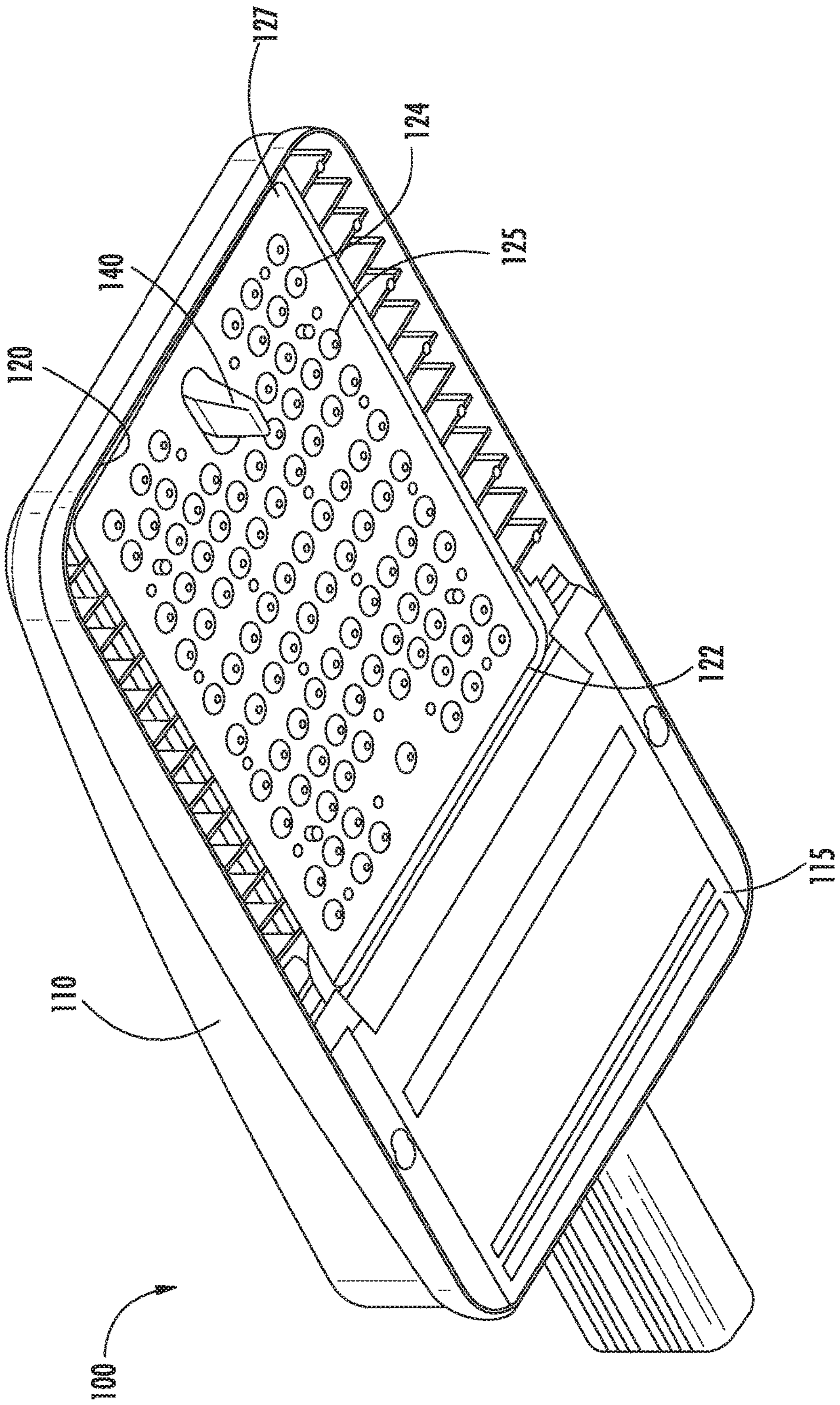
FIG. 1 depicts a bottom perspective view of an example lighting fixture according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to lighting fixtures with improved thermal characteristics, for instance, to accommodate higher wattage light sources. As one example, the lighting fixture can be configured to accommodate a higher LED wattage, such as about 400 W or more of LED wattage. The lighting fixtures can include various features to facilitate accommodating the higher wattage lighting sources, such as features designed to improve thermal performance of the lighting fixture and to accommodate an increased number of LED devices to provide the higher wattage of output.

In some embodiments a lighting fixture according to example embodiments of the present disclosure can include cooling fins disposed on the exterior of a housing of the lighting fixture. The number of cooling fins can be increased relative to lighting fixtures accommodating lower wattage light sources. The increased number of cooling fins can increase the surface area of the external housing exposed to the external ambient, leading to increased dissipation of heat generated in the higher wattage light fixture.

In some embodiments, a lighting fixture can include means for securing one or more drivers or other electrical components to the housing to decrease thermal resistance between one or more of the drivers or other electrical components the housing. For instance, a lighting fixture can include a clamp bar. The clamp bar can be attachable to the housing portion and can be configured to be positioned adjacent to and in some cases overlapping the driver(s) to increase the thermal conduction (and/or decrease thermal resistance) between the driver(s) and/or other electrical components and the housing portion. The housing portion can be made of metal (e.g., aluminum) or other rigid material to provide sufficient structural integrity and to provide heat exchange between the driver(s) and the ambient air. The clamp bar can create a force on the driver(s) to increase the surface area contact between the driver(s) and the housing portion. In this way, the clamp bar can increase thermal conduction (and/or decrease thermal resistance) and allow for greater heat transfer between the driver(s) and the housing portion, which can act as a passive heat exchanger to transfer the heat generated by the driver(s) through the housing portion into the ambient air. Moreover, the clamp bar can be configured to accommodate drivers of varying size and shape. In this way, the clamp can accommodate for a change in future driver selection by not requiring a specific mounting hole pattern for the drivers. Additionally, the clamp bar can help avoid attaching the drivers directly to the housing to reduce unsightly protrusions, etc.

More specifically, in some embodiments, an electrical power circuit of a lighting fixture can be configured to convert alternating current (AC) from a power source to direct current (DC) to energize a light engine having one or more light sources (e.g., LED devices). In some implementations, the electrical power circuit can include a surge protector, a transformer, and one or more driver(s). The surge protector can be coupled to the transformer such that it can receive the power from the surge protector (e.g., in a series configuration of the surge protector). The surge protector can be positioned upstream or downstream of the transformer (e.g., depending on the voltage rating selected for the surge protector). The transformer can be configured to alter the voltage of the power for use by the driver(s). The driver(s) can be configured to receive the power from the transformer and to convert the power from the transformer to a DC power to energize one or more light sources.

In some embodiments, the components of the electrical power circuit can be attached or secured to a lower housing portion of the lighting fixture. The lower housing portion can be adjustably mounted with respect to the lighting fixture such that the lower housing portion is movable between a closed position to an open position. For instance, the lower housing portion can be moved to the open position to access the components of the electrical power circuit for maintenance or other purposes.

According to particular aspects of the present disclosure, a clamp bar can be positioned at least partially overlapping the driver(s) to secure the driver(s) to the lower housing portion. For instance, the clamp bar can include a base wall, which can extend in a transverse direction and a lateral direction. The base wall can include an inner surface and an outer surface. The inner surface can be configured to face towards the driver(s) and the outer surface can be configured to face away from the driver(s). In some implementations, the inner surface of the base wall can be configured to come into contact with one or more of the driver(s) (e.g., a top surface of a driver).

Additionally, and/or alternatively, the clamp bar can include one or more end wall(s). For example, the clamp bar can include a first end wall and a second end wall. In some implementations, the end wall(s) can be positioned at the transverse ends of the base wall, as further described herein. In some implementations, the clamp bar can be configured such that there is clearance between the driver and the end walls. In some implementations, the end wall(s) can be configured to contact the driver(s). For instance, at least a portion of the end wall(s) can be configured to contact the top surface of one or more of the driver(s) and/or one or more side surface(s) of the driver(s).

The clamp bar can be attachable to the lighting fixture. For instance, the clamp bar can be attachable to the lower housing portion. By way of example, the clamp bar can include one or more attachable portion(s) (e.g., flange(s)) that can be used to attach the clamp to the lower housing portion). The clamp bar can be configured to be attached to the lower housing portion such that the clamp bar can secure one or more of the driver(s) in place. For example, the clamp bar can be configured to be attached to the lower housing portion such the inner surface of the base wall is positioned adjacent to and/or in contact with a top surface of the driver(s), while the end walls are positioned adjacent to and/or in contact with the side surfaces of one or more of the driver(s). In this way, the clamp bar can limit and/or prevent the movement of the driver(s) in the transverse and/or lateral directions, as well as in a direction that is generally perpendicular to the lower housing portion. The clamp bar can, thus, support the driver(s), for instance, when the lower housing portion is being adjusted from a closed position to an open position, and vice versa.

The clamp bar can be configured to facilitate and/or enhance heat transfer between the driver(s) and the lower housing portion. In some embodiments, the clamp bar can be configured to provide a force to the driver(s) (e.g., in a direction generally perpendicular to a top surface of the driver(s)). The force can occur, for example, when the clamp bar is attached and secured to the lower housing portion. Upon application of the force, the driver(s) can be pressed against the lower housing portion to increase the surface area of the driver(s) contacting the lower housing portion. In this way, the clamp bar can increase the amount of heat transferred between the driver(s) and the lower housing portion, which can act as a heat exchanger to transfer the heat generated by the driver(s) into the ambient air surrounding the lighting fixture.

In still other embodiments, the lighting fixture can include a light engine having a distribution of LED devices that accommodates an increased number of LED devices while providing for improved thermal dissipation properties of the light engine. For instance, the light engine can include an LED board having a plurality of LED devices. The LED board can have a center portion and a peripheral portion. A spacing between LED devices located at or near the center portion can be greater than a spacing between LED devices located at or near a peripheral portion. In this way, the LED devices can be more concentrated (e.g., have a higher density) near the peripheral edge of the light engine where there is a shorter heat conduction path through the LED board through the housing of the lighting fixture to the ambient for dissipation of heat generated by the LED devices. Moreover, the LED devices located at or near the center portion tend to experience higher temperatures (e.g., due at least in part to the longer conduction path to peripheral elements of the fixture/heat sink, as described herein). Thus, the density of LED devices located at or near the center portion can be decreased to lower the temperature of these LED devices experiencing higher temperatures. Additionally, the temperature distribution of the LED board can be more uniform (e.g., LED devices located at or near a peripheral portion can run hotter than they would otherwise). The more uniform temperature distribution can lead to other benefits, such as better control of current balance through parallel LED strings.

As used herein, a "lighting fixture" or "luminaire" refers to a device used to provide light or illumination using one or more light sources. The use of the term “about” when used in conjunction with a numerical value is intended to refer to within 25% of the stated numerical value. “Generally perpendicular” means within 20° of perpendicular.

Figure 2:
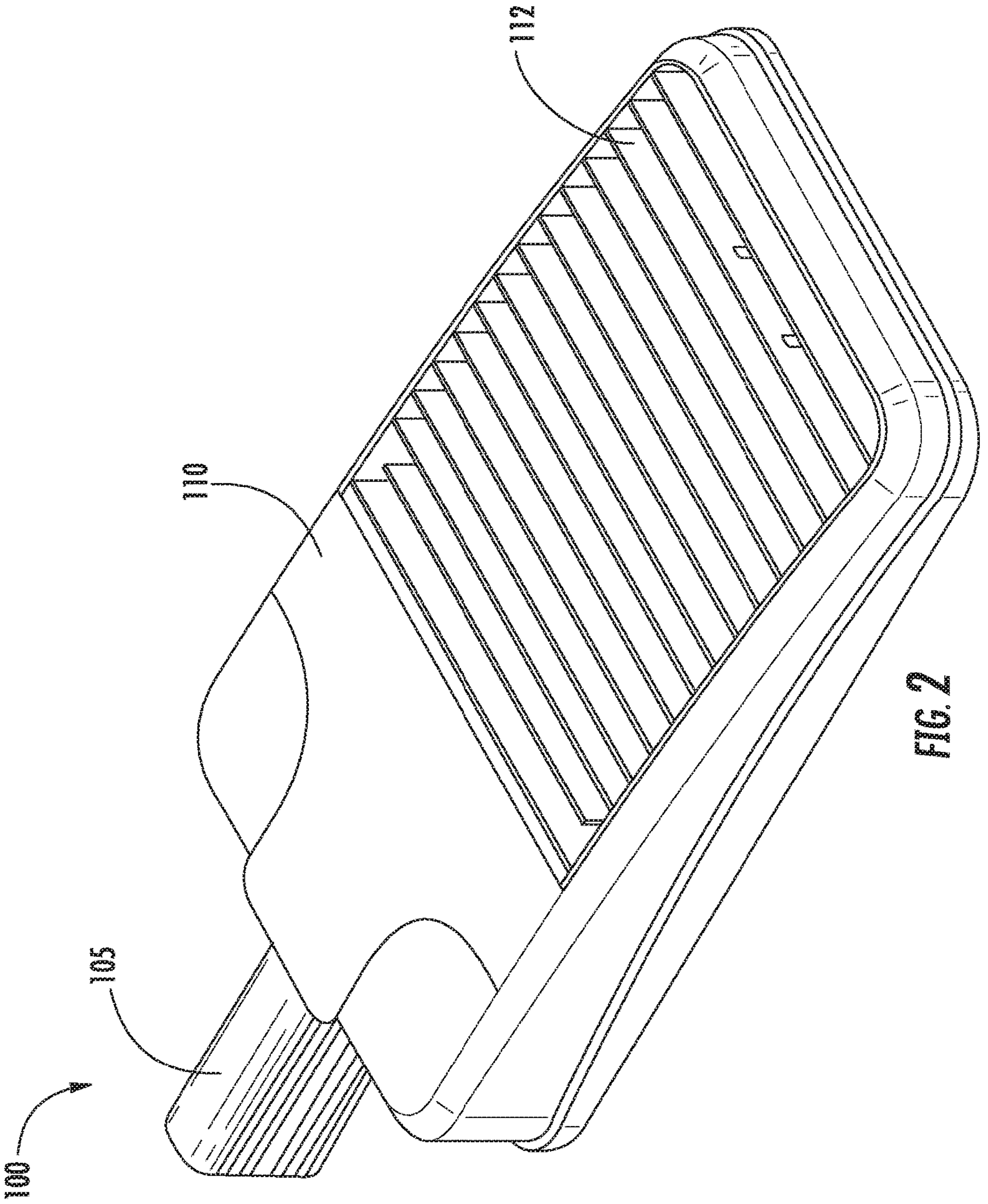
FIG. 2 depicts a top perspective view of an example lighting fixture according to example embodiments of the present disclosure.
Figure 3:
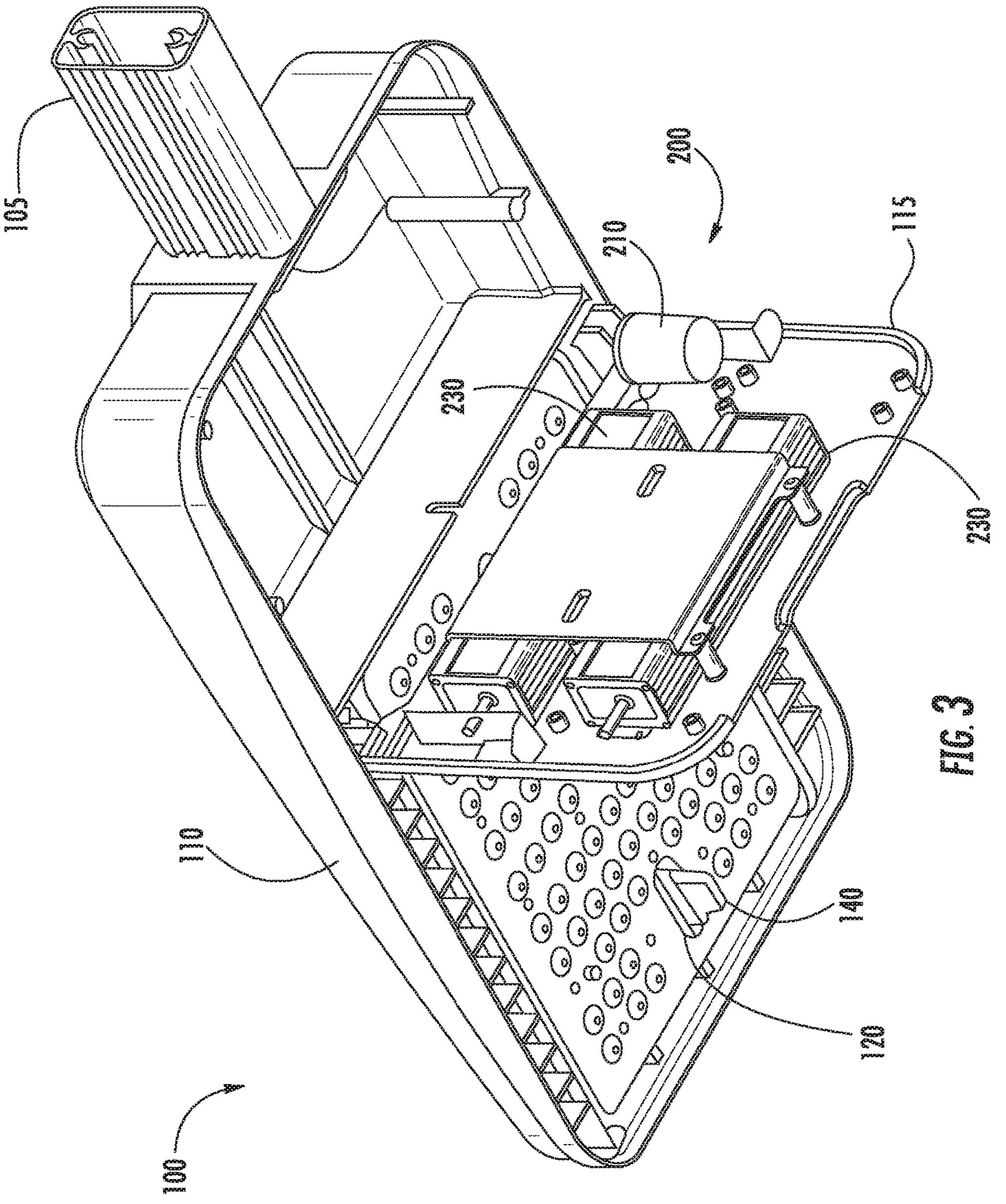
FIG. 3 depicts an example lighting fixture with a lower housing portion in an open position according to example embodiments of the present disclosure.

FIGS. 1-3 depict an example lighting fixture 100 according to example embodiments of the present disclosure. The lighting fixture 100 can be, for instance, an area lighting fixture configured to provide lighting for a space, such as a roadway, area or site, parking area, pathway, auto dealership, etc. The lighting fixture 100 can be mounted to a pole, wall, or other structure using a plurality of different mounting options. For instance, the lighting fixture 100 can include an arm 105 for mounting to a pole, wall, or other structure. The lighting fixture 100 can be mounted, for instance, using a horizontal arm, vertical tenon, or traditional arm mounting. Mounting options can include use of a wall bracket, adjustable knuckle, outer diameter slip fit arm mount, rectangular arm, etc.

The lighting fixture 100 can include a housing 110 configured to secure and house various components of the lighting fixture 100, such as electrical components, conductors, and other components of the lighting fixture 100. The housing 110 can be made from a suitable material such as such as aluminum, die cast aluminum, stainless steel, galvanized steel, powder coated steel, or other material. The housing 110 can act as a thermal heat sink for heat generated by electrical components and light sources (e.g., LED devices) associated with the lighting fixture by conducting heat away from heat generating sources within the housing to the ambient.

The lighting fixture 100 can further include an LED system 120 (e.g., an LED cartridge). The LED system 120 can include an LED light engine 122 including a plurality of LED devices 125 mounted on an LED board. The LED devices 125 can be configured to emit light as a result of movement of electron through a semiconductor material. The LED devices 125 can be of any suitable size, color, color temperature, etc. for desired light applications. For instance, the LED devices 125 can have a color temperature of 3000K, 4000K, 5000K or other suitable color temperature.

An optic 124 (e.g., a lens) can be positioned over each LED device 125. The optics 124 and/or arrangement of LED devices 125 can be configured to provide a variety of different light distributions, such as a type I distribution, type II distribution, type III distribution, type IV distribution, type V distribution (e.g., round, square, round wide, etc.) or other light distribution.

A gasket (e.g., a polyurethane gasket) can be placed over the optics 124 to ensure alignment of the optics 124 with the LED devices 125 and to weatherproof the LED light engine 122. In some implementations, the gasket can aid in alignment in the direction perpendicular to the LED board, for instance, by pressing the optics 124 against the LED board. In some implementations, the lighting fixture 100 can include alignment pins that can be integral to the optics 124 and fit into holes on the LED board to aid lateral and traverse alignment of the optics 124. The LED light engine 122 including LED devices 125 and optics 124 can be secured to a bezel 127. The bezel 127 can be made from any suitable material, such as stainless steel. In some implementations, the fixture 100 can include a one-piece bezel with integral molded-in optical elements and/or a plastic bezel with optics adhered (and/or sonically welded) to the bezel. The LED system 120 can be mounted into the housing 110 to provide a light source for the lighting fixture 100.

Example aspects of the present disclosure are discussed with LED light sources for purposes of illustration and discussion. Those of ordinary skill in the art, using the disclosures provided herein, will understand that other suitable light sources (e.g., other solid state light sources, fluorescent light sources, etc.) can be used without deviating from the scope of the present disclosure.

The lighting fixture 100 can include a power circuit 200 for providing power to energize the LED light engine 122. For instance, the power circuit can include surge protective device(s) 210, transformer(s) 220 (shown in FIG. 4), and driver(s) 230 for converting an AC power to a DC power for energizing the LED devices 125 located on the LED light engine 122. Example driver circuits can accept, for instance, about a 100V to about a 277 V 50 Hz or 60 Hz AC input or about a 347V to 480V 50 Hz or 60 Hz AC input. In some embodiments, the driver circuits can be dimmable driver circuits. Example driver circuits include the PLED series drivers manufactured by Thomas Research Products. Example driver circuits are also illustrated in U.S. Patent Application Publication No. 2015/0351205, which is incorporated herein by reference.

In some embodiments, the lighting fixture 100 can include one or more control devices for controlling various aspects of the lighting fixture. For instance, in some implementations, the lighting fixture can include one or more motion sensors configured to detect motion in a space around the lighting fixture. When no motion is detected for a specified period of time, one or more control devices (e.g., processors, controllers, microcontrollers, application specific integrated circuits) can control operation of the driver(s) 230 to reduce the light output (e.g., operate at a lower wattage) of the lighting fixture 100. When motion is detected, the one or more control devices can control operation of the driver(s) 230 to operate the lighting fixture 100 to provide its full light output or other preset level.

In some embodiments, the lighting fixture 100 can include one or more photocells. The lighting fixture 100 can include one or more control devices that can control operation of the driver(s) 230 to provide dimming based on on/off relays (which interrupt power), signals received from the photocells and/or signals indicative of a real time clock. For instance, the one or more control devices can control operation of the driver(s) to provide dimming according to a set dimming schedule, dimming based on a simple delay after activating the light sources, dimming based on hours of operation or time of night, or other suitable control scheme.

In some embodiments, the lighting fixture 100 can include a wireless module 140 coupled to the light engine 122. The wireless module 140 can be coupled to the LED light engine 122. The wireless module 140 can be used for communicating with a remote controller (e.g., computing device) over a wireless network. Control signals can be communicated to the lighting fixture 100 via the wireless module 140 to control the driver(s) 230, for instance, based on set time and date schedules that are programmed using a suitable user interface. Example aspects of the wireless module 140 and example aspect of systems and methods for controlling the lighting fixture 100 using, at least in part, the wireless module 140 are discussed in in U.S. Patent Application Publication No. 2015/0351205, which is incorporated herein by reference.

As shown in FIG. 2, the lighting fixture 100 can include a plurality of cooling fins 112 located in the housing 110 at a location proximate to and/or above the location of the LED system 120 in the lighting fixture 100. The cooling fins 112 provide increased surface area of the housing 110 relative to the ambient to facilitate thermal transfer of heat generated by the LED devices 125 in the LED system 120. In lighting fixtures accommodating higher wattage light sources (e.g., higher LED wattage), the number of cooling fins can be increased relative to lighting fixtures accommodating lower wattage light sources. For instance, as shown in FIG. 2, the lighting fixture 100 can include about 10 to about 20 cooling fins, such as about 15 cooling fins. In some implementations, the lighting fixture 100 can include at least twice as many cooling fins in applications accommodating higher wattage sources (e.g., about 400 W or more) relative to applications accommodating lower wattage sources (e.g., about 300 W or less).

Referring to FIGS. 1-3, the housing 110 can include a lower housing portion 115. The lower housing portion 115 can be used to house electrical components of the power circuit 200 (e.g., surge protectors, transformers, drivers) for the lighting fixture 100. The lower housing portion 115 can be adjustable with respect to the housing 110. For instance, the lower housing portion 115 can be temporary or permanently attached to the housing 110. In some implementations, the lower housing 115 can include one or more mounting bracket(s) 117 (shown in FIG. 4). The mounting bracket(s) 117 can include, for example, a pin, a joint, a pivotable connection, etc. The mounting bracket(s) 117 can be configured to be temporary or permanently attached to the housing 110, such that the lower housing portion 117 can be adjustable (e.g., slideable, pivotable, movable) relative to the housing 110. In some implementations, the lower housing portion 115 can be configured to be removed from the housing 110. The lower housing portion 115 can be movable between a closed position and an open position.

FIG. 3 depicts a view of the example lighting fixture 100 with a lower housing portion 115 in an open position according to example embodiments of the present disclosure. As shown, the lower housing portion 115 can be adjustable and/or removable with respect to the lighting fixture 100. For example, the lower housing portion 115 can be adjusted from a closed position (e.g., as shown in FIG. 1) to an open position (e.g., as shown in FIG. 3). In this way, the components (e.g., power circuit 200) within the lower housing portion 115 can be accessed for repair, replacement, maintenance, etc.

Figure 4:
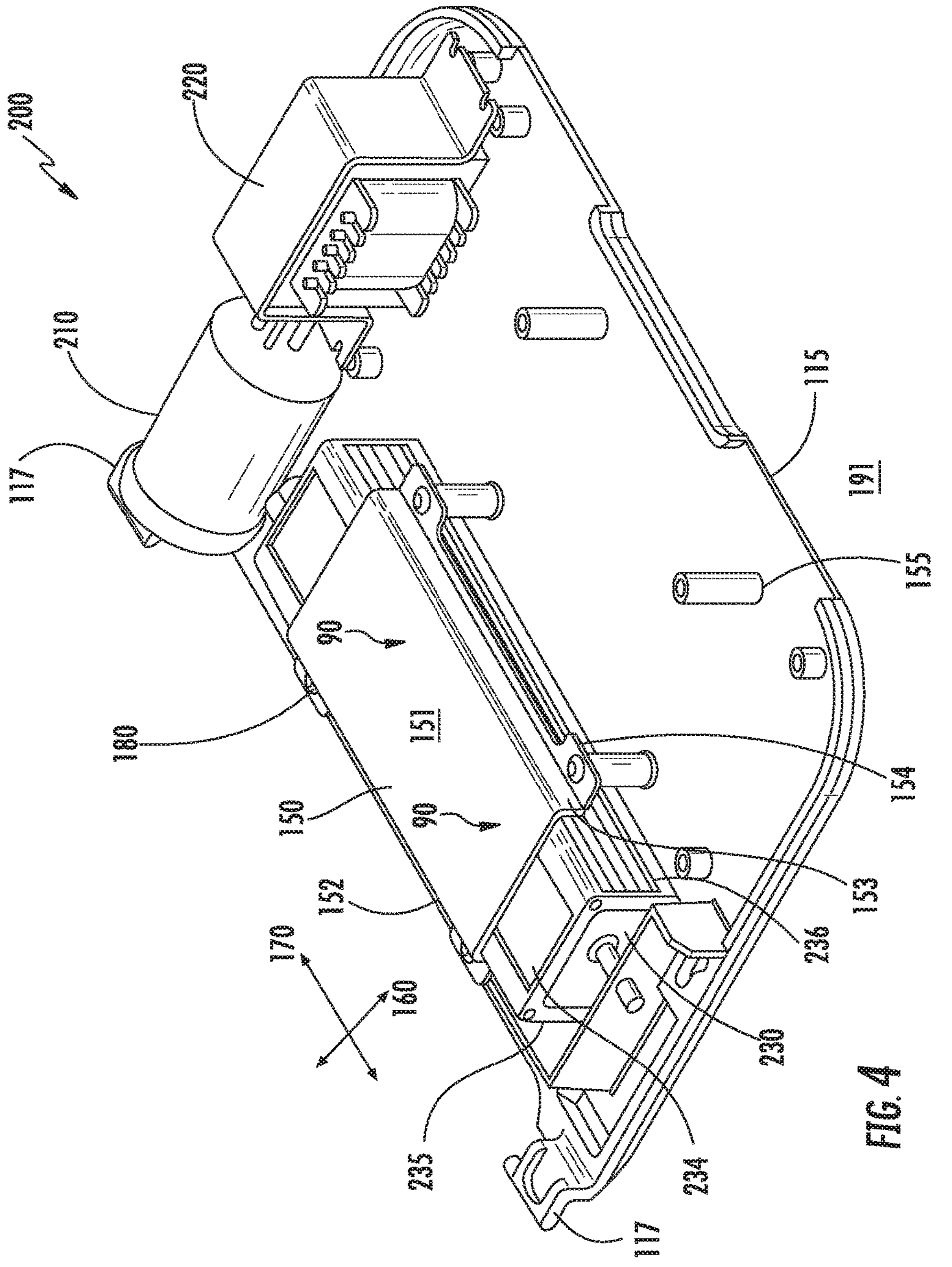
FIG. 4 depicts an example housing portion for supporting electrical components of a lighting fixture according to example embodiments of the present disclosure.

FIG. 4 depicts an example arrangement of electrical components of the power circuit 200 with respect to the lower housing portion 115 according to example embodiments of the present disclosure. The power circuit 200 can include a surge protector 210, a transformer 220, and a driver 230. The numbers, types, orientations, locations, configurations, etc. of the components of the power circuit 200 shown in FIG. 4 are provided for purposes of illustration and discussion and are not intended to be limiting. For example, the components of the power circuit 200 can be located in various different orientations, sizes, locations, configurations, etc. Additionally, and/or alternatively, the power circuit 200 can include more, less, and/or different components than shown. For example, as further described herein, the power circuit 200 can include more than one driver 230.

The power circuit 200 can be configured to convert alternating current (AC) from a power source (not shown) to direct current (DC) for use by the lighting fixture (e.g., a light engine). For example, the surge protector 210 can be configured to initially receive electrical current from a power source (e.g., a power grid, battery) and to protect the power circuit 200 and other electrical components of the lighting fixture 100 from spikes, lightning induced surges, electrical anomalies, etc. The power circuit 200 can be configured to include different types, and/or sizes of the surge protector 210.

The surge protector 210 can be configured in series and/or in parallel. In some implementations, the surge protector include a mechanism to shut off fixture power when the surge protector is exhausted and can be coupled to the transformer 220 such that the transformer receives power from the surge protector 210 (e.g., in a series configuration). The transformer 220 can be configured to alter the voltage for use by the driver 230. For example, the transformer 220 can be a step-down transformer that can be configured to decrease the voltage of the input AC power to a voltage level suitable for the driver 230 (e.g., about 100 to about 277V).

The driver 230 can be configured to receive power from the transformer 220 and energize one or more component(s) of the fixture 100. The driver 230 can be configured to convert the current from AC power to DC power. Additionally, and/or alternatively, the driver 230 can provide constant current and/or DC power to one or more component(s) of the fixture 100, such as a light engine. In this way, the light engine can illuminate one or more LED devices when energized by the driver 230. As discussed above, the driver(s) 230 can be dimmable driver(s). Example driver circuits include the PLED series drivers manufactured by Thomas Research Products. Example driver circuits are also illustrated in U.S. Patent Application Publication No. 2015/0351205, which is incorporated herein by reference.

The lower housing portion 115 can be configured to support the surge protector 210, the transformer 220, the driver 230, and/or other components. For instance, one or more of the surge protector 210, the transformer 220, the driver 230, and/or other components can be attached to the lower housing portion 115, via a suitable attachment mechanism (e.g. fastener, screw, bolt, mounting boss, docketing sleeve, hole, male/female mechanism, etc.).

According to example embodiments of the present disclosure, the lighting fixture 100 can include means for securing the one or more drivers to the housing to decrease thermal resistance between one or more of the drivers and the housing. In some embodiments, the means can include a clamp bar used to secure the driver 230 to the lower housing portion 115 according to example embodiments disclosed herein. As shown in FIG. 4, a clamp bar 150 can be attached to the housing via one or more attachment mechanism(s) 155. The attachment mechanism(s) 155 can include a mounting boss, docketing sleeve, hole, male/female mechanism, etc. The clamp bar 150 can have any suitable shape or configuration and is not limited to an elongate shape as illustrated in FIG. 4.

The clamp bar 150 can be positioned at least partially overlapping the driver 230. For instance, the clamp bar 150 can include a base wall 151, which can extend in a transverse direction 160 and a lateral direction 170. The base wall 151 can include an inner surface and an outer surface. The inner surface can be configured to face towards the driver 230 and the outer surface can be configured to face away from the driver 230. In some implementations, the inner surface of the base wall 151 can be configured to come into contact with the driver 230 (e.g., a top surface 234 of the driver 230). In some implementations, a component (e.g., a liner, mechanical component, other electrical component) can be positioned between the base wall 151 of the clamp bar 150 and the driver 230.

Additionally, and/or alternatively, the clamp bar 150 can include one or more end wall(s) 152, 153. For example, the clamp bar 150 can include a first end wall 152 and a second end wall 153. In some implementations, the end wall(s) 152 and 153 can be positioned at the transverse ends of the base wall 151, as shown in FIG. 4. Additionally, and/or alternatively, the end wall(s) 152 and 153 can be positioned at the lateral ends of the base wall 151. In some implementations, the clamp bar 150 can be configured such that there is clearance between the driver 230 and the end wall(s) 152 and 153.

In some implementations, the end wall(s) 152 and 153 can be configured to contact the driver 230. For instance, at least a portion of the end wall(s) 152 and 153 can be configured to be positioned adjacent to and/or to contact the top surface 234 of the driver 230 and/or one or more side surface(s) 235, 236. By way of example, the first end wall 152 can be configured to be positioned adjacent to and/or to contact a first side surface 235 of the driver 230 and the second end wall 153 can be configured to be positioned adjacent to and/or to contact a second side surface 236. In some implementations, a component (e.g., a liner, mechanical component, other electrical component) can be positioned between the end walls 152 and 153 of the clamp bar 150 and the driver 230.

The clamp bar 150 can be attachable to the lighting fixture housing 110. For instance, the clamp bar 150 can be attachable to the lower housing portion 115. By way of example, as shown in FIG. 4, the clamp bar 150 can include one or more attachable portion(s) 154 (e.g., flange(s)) that can be configured to be used to attach the clamp bar 150 to the lower housing portion 115 (e.g., to the attachment mechanism(s) 155) via one or more fastener(s) 180. Additionally, and/or alternatively, the clamp bar 150 can be attached to lower housing portion 115 by any suitable mechanism, such as via screws (as shown), buttons, rivets, nails, other fasteners, snap connections, male-female connections, sliding connections, adhesives, etc.

The clamp bar 150 can be configured to be attached to the lower housing portion 115 such that the clamp bar 150 can secure the driver 230 in place. For example, the clamp bar 150 can be configured to be attached to the lower housing portion 115 such that the inner surface of the base wall 151 is positioned adjacent to and/or in contact with the top surface 234 of the driver 230, the first end wall 152 is positioned adjacent to and/or in contact with the first side surface 235 of the driver 230, and/or the second end wall 153 is positioned adjacent to and/or in contact with the second side surface 236. In this way, the clamp bar 150 can limit and/or prevent the movement of the driver 230 in the transverse direction 160 and/or lateral direction 170, as well as in a direction that is generally perpendicular to the lower housing portion 115. The clamp bar 150 can, thus, support the driver 230 when the lower housing portion 115 is being adjusted (e.g., from a closed position to an open position).

The clamp bar 150 can be configured to facilitate and/or enhance heat transfer between the driver 230 and the lower housing portion 115. For instance, the housing portion 115 can be made of metal, such as aluminum, die cast aluminum, stainless steel, galvanized steel or powder coated steel, or other rigid material to provide sufficient structural integrity and provide direct convective heat exchange between the driver 230 and the ambient air 191. The clamp bar 150 can include any material that is sufficiently rigid to perform the functions as described herein. For example, the clamp bar 150 can be made of steel, aluminum, other metal, plastic, wood, composite, and/or any combination thereof. In some implementations, the material of the clamp bar 150 can be selected such that a heat sink is created between the driver 230 and the lower housing portion 115 and not between the clamp bar 150 and the driver 230. In some implementations, the material of the clamp bar 150 can be selected such the heat exchange between the driver 230 and the lower housing portion 115 is greater than the heat exchange between the clamp bar 150 and the driver 230.

The clamp bar 150 can be configured to provide a force 90 to the driver 230 (e.g., in a direction generally perpendicular to the top surface 234). The force 90 can occur, for example, when the clamp bar 150 is attached to the lower housing portion 115. Upon application of the force 90, the driver 230 can be pressed against the lower housing portion 115 to increase the surface area of the driver 230 that is contacting the lower housing portion 115 and/or the surface area of the lower housing portion 115 that is contacting the driver 230. In this way, the clamp bar 150 can increase the amount of heat transferred between the driver 230 and the lower housing portion 115, which can act as a passive heat exchanger to transfer the heat generated by the driver 230 into the ambient air 191 surrounding the lighting fixture 100. More particularly, the clamp bar 150 can be configured to decrease thermal resistance between the driver 230 and the lower housing portion 115. In some implementations, the lighting fixture 100 can include a component between the driver 230 and the lower housing portion 115, such as a heat spreader, to further facilitate the heat exchange.

Figure 5:
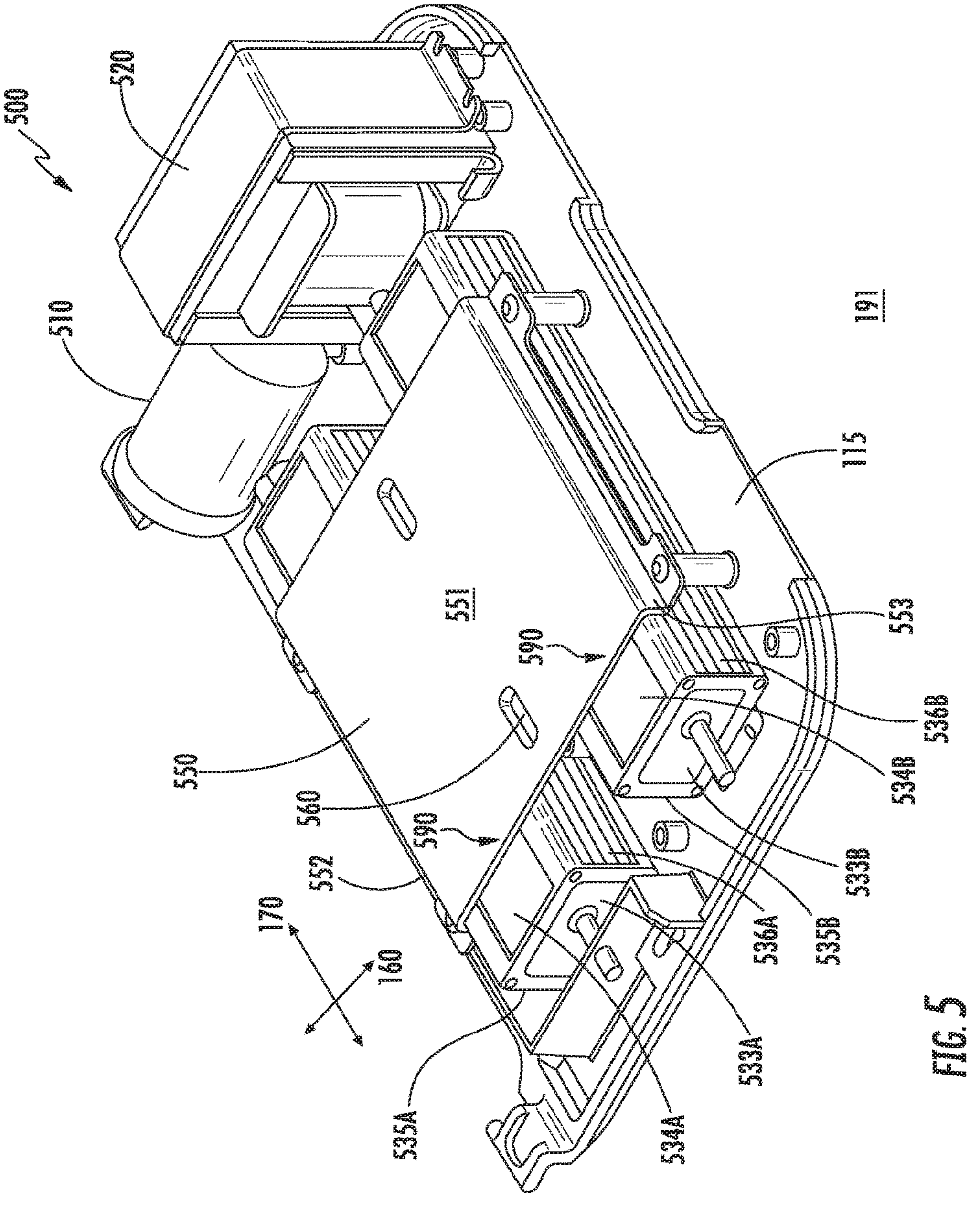
FIG. 5 depicts an example housing portion for supporting electrical components of a lighting fixture according to example embodiments of the present disclosure.

In some implementations, the power circuit can include a plurality of drivers. For instance, FIG. 5 depicts a power circuit 500 including a plurality of drivers according to example embodiments of the present disclosure. More than one driver can be included, for example, to accommodate for a greater number of LEDs on a light engine of the lighting fixture 100. As shown, the power circuit 500 can include a first driver 533A and a second driver 533B. The power circuit 500 can include a larger transformer 520 (than shown in FIG. 4) to accommodate for the plurality of drivers (e.g., 533A, 533B). In some implementations, the plurality of drivers can include more than the first and second drivers 533A, 533B shown in FIG. 5.

In some implementations, the lighting fixture 100 can include a clamp bar 550 that can be configured to be positioned adjacent to the plurality of drivers (e.g., 533A, 533B). For instance, the clamp bar 550 can include a base wall 551 that can extend in the transverse direction 160 and a lateral direction 170 to cover, at least a portion of, a top surface 534A of the first driver 533A and/or at least a portion of a top surface 534B of the second driver 533B. The base wall 551 can include an inner surface and an outer surface. The inner surface can be configured to face towards the plurality of drivers (e.g., 533A, 533B) and the outer surface can be configured to face away from the plurality of drivers (e.g., 533A, 533B). In some implementations, the inner surface of the base wall 551 can be configured to come into contact with the plurality of drivers (e.g., a top surface 534A of the first driver 533A and/or a top surface 534B of the second driver 533B). As indicated above, in some implementations, a component can be positioned between the clamp bar 550 and one or more of the plurality of drivers (e.g., 533A, 533B).

The clamp bar 550 can include one or more end walls, such as a first end wall 552 and a second end wall 553. In some implementations, the end wall(s) 552 and 553 can be positioned at the transverse ends of the base wall 551, as shown in FIG. 5. Additionally, and/or alternatively, the end wall(s) 552 and 553 can be positioned at the lateral ends of the base wall 551. In some implementations, the end wall(s) 552 and 553 can be configured to be positioned adjacent to one or more of the plurality of drivers (e.g., 533A, 533B). In some implementations, the clamp bar 550 can be configured such that there is clearance between the driver(s) 533A-B and the end wall(s) 552 and 553.

In some implementations, the end wall(s) 552 and 553 can be configured to contact one or more of the plurality of drivers (e.g., 533A, 533B). For instance, at least a portion of the end wall(s) 552 and 553 can be configured to be positioned adjacent to and/or to contact the top surface 534A of the first driver 533A, the top surface 534B of the second driver 533B, and/or one or more side surface(s) 535A, 536A, 535B, 536B of one or more of the plurality of drivers (e.g., 533A, 533B). By way of example, the first end wall 552 can be configured to be positioned adjacent to and/or to contact a side surface 535A of the first driver 533A and the second end wall 553 can be configured to be positioned adjacent to and/or to contact a side surface 536B of the second driver 533B. In other implementations, the clamp bar 550 can be configured to be positioned adjacent to and/or to contact one or more other portions of the plurality of drivers (e.g., 533A, 533B). The clamp 550 can be configured to be attached to the lower housing portion 115 such that the clamp 550 can secure one or more of the plurality of drivers (e.g., 533A, 533B) in place, in a manner similar to that described above with reference to FIG. 4.

In some implementations, the clamp bar 550 can include one or more separators 560. The separators 560 can be configured to physically separate and/or create space between one or more of the plurality of drivers (e.g., 533A, 533B). This can help maintain a uniform and/or minimum spacing to allow for convective heat transfer from the side surfaces of the drivers (e.g., 533A, 533B). As shown, the separators 560 can include a portion that protrudes from the inner surface of the base wall 551 in a direction towards the drivers 533A and/or 533B. Additionally, and/or alternatively, the separators 560 can include other suitable mechanisms to separate and/or create space between one or more of the plurality of drivers (e.g., 533A, 533B). For instance, in some implementations, the separators 560 can include one or more component(s) that are appended and/or attached to clamp 550 and configured to separate and/or create space between one or more of the plurality of drivers (e.g., 533A, 533B). In some implementations, the attachment mechanism(s) 155 of the lower housing portion can also, and/or alternatively, be configured to separate and/or create space between one or more of the plurality of drivers (e.g., 533A, 533B).

Additionally, and/or alternatively, the clamp bar 550 can be configured to facilitate and/or enhance heat transfer between one or more of the plurality of drivers (e.g., 533A, 533B) and the lower housing portion 115, in a manner similar to that described above with reference to FIG. 4. For example, the clamp bar 550 can be configured to provide a force 590 to the first driver 533A (e.g., in a direction generally perpendicular to the top surface 534A) and/or to the second driver 533B (e.g., in a direction generally perpendicular to the top surface 534B). The force 590 can occur, for example, when the clamp bar 550 is attached to the lower housing portion 115. Upon application of the force 590, the first driver 533A and/or the second driver 533B can be pressed against the lower housing portion 115 to increase the surface area of the first driver 533A and/or the second driver 533B that is contacting the lower housing portion 115 and/or the surface area of the lower housing portion 115 that is contacting the first driver 533A and/or the second driver 533B. In this way, the clamp bar 550 can increase the amount of heat transferred between the first driver 533A and/or the second driver 533B and the lower housing portion 115, which can act as a passive heat exchanger to transfer the heat generated by the first driver 533A and/or the second driver 533B into the ambient air 191. In some implementations, the lighting fixture 100 can include a component between the first driver 533A and/or the second driver 533B and the lower housing portion 115, such as a heat spreader, to further facilitate the heat exchange. In such a case, the clamp 550 can be configured to increase thermal conduction (and/or decrease thermal resistance) between one or more of the driver(s) (e.g., 533A, 533B) and the lower housing portion 115 by increasing the surface area contact between one or more of the driver(s) (e.g., 533A, 533B) and such a component, and/or the surface area contact between such a component and the lower housing portion 115. In some implementations, the lighting fixture can include a plurality of clamp bars to perform the function of clamp bars 150 and 550 as described herein.

Figure 6:
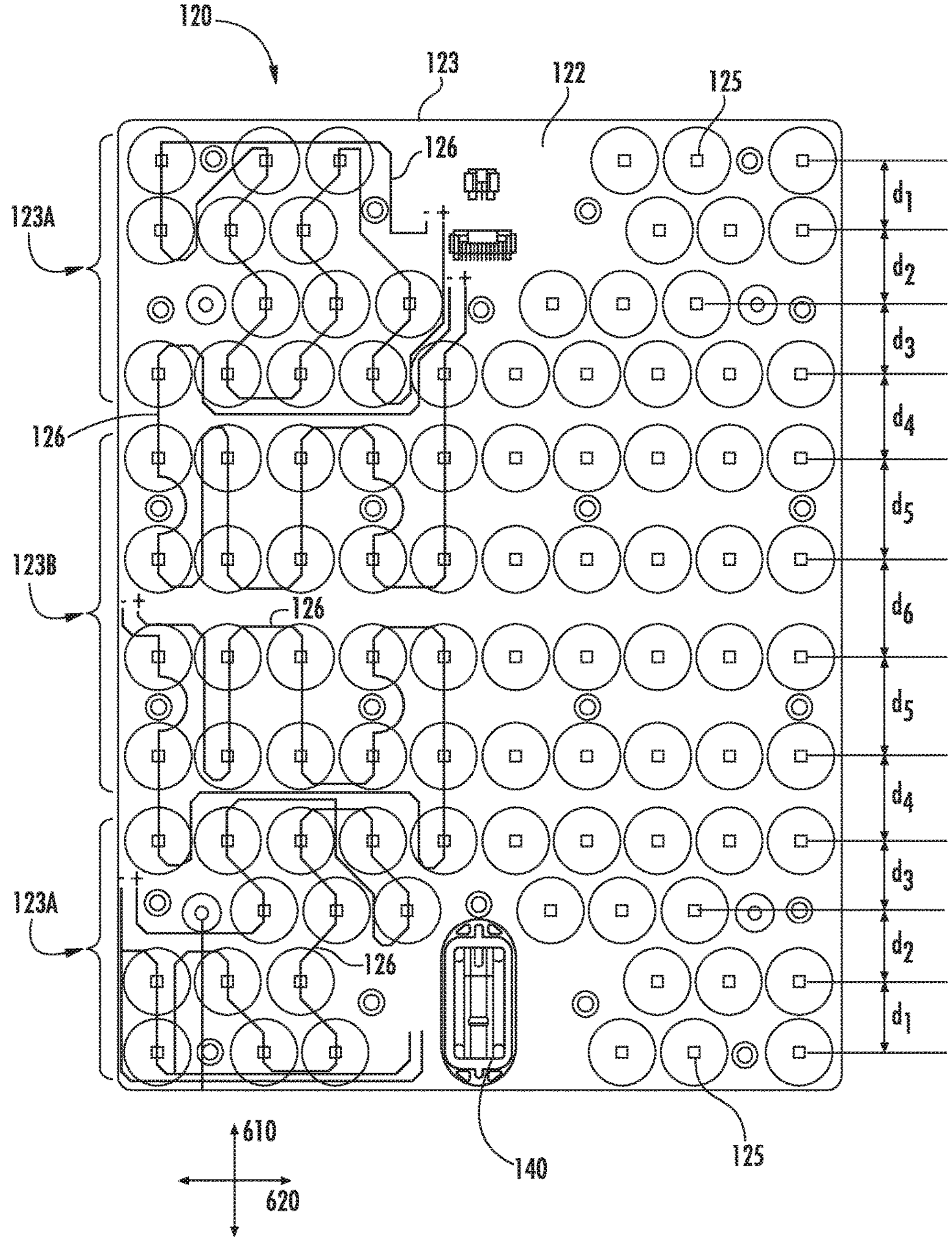
FIG. 6 depicts an example distribution of LED devices on an LED board according to example embodiments of the present disclosure.

FIG. 6 depicts a portion of an example LED system 120 according to example embodiments of the present disclosure. More specifically, FIG. 6 depicts a planar view of an example light engine 122 having an LED board 123 with a plurality of LED devices 125 distributed across the LED board 123. The LED board 123 can be, for instance, a printed circuit board 123 having a plurality of LED devices 125 positioned on the LED board 123. A wireless module 140 can be coupled to the light engine 122. Details concerning an example wireless module 140 are provided in U.S. Patent Application Publication No. 2015/0351205, attached as Appendix A, which forms a part of this disclosure.

More particularly, the light engine 122 can include a plurality of LED strings. Each LED string can include a plurality of LED devices 125 connected in series with one another. In the embodiment shown in FIG. 6, the light engine 122 include eight LED strings. Representative series coupling of four of the LED strings is illustrated on the left hand side of the light engine 122 through the use of traces 126. For instance, each trace 126 illustrates a series connection of one of the plurality of LED devices. The LED strings located on the right hand side of the light engine 122 can be connected in a similar manner to the LED strings illustrated on the left hand side of the light engine 122.

According to particular aspects of the present disclosure, the distribution of LED devices 125 on the LED board 123 can be provided such that there are varying densities of LED devices 125 across the LED board 123. More specifically, one portion of the LED board 123 can include a higher density of LED devices 125 relative to other portions of the LED board 123. This can be accomplished by varying the spacing between LED devices 125 across the LED board 123 to achieve a varying density pattern for the LED devices 125.

In the example of FIG. 6, the LED board 123 can be a rectangular LED board having a length dimension (e.g., a long dimension) defining a first axis 610 and a width dimension defining a second axis 620. The LED board 123 can include peripheral portions 123A located at or near the end portions of the LED board 123 along the first axis 610 and a center portion 123B between the two peripheral portions 123A. The size of the peripheral portions 123A and the center portion 123B can be any size and is not limiting of the present disclosure. As shown, the light engine 122 includes a distribution of LED devices 125 having a greater density in the peripheral portions 123A relative to a density of a distribution of LED devices 125 in the center portion 123B.

In some implementations, the varying densities of the LED devices 125 across the LED board 123 can be achieved by varying the spacing between LED devices 125 across one or more dimensions along the LED board 123. For instance, in the example of FIG. 6, the distance between rows of LED devices 125 is varied along the length dimension (e.g., the long dimension) defining the first axis 610.

For instance, a first distance d1 along the length dimension (e.g., the long dimension) can be provided between the first two rows of LED devices 125 from an end portion of the LED board 123. Moving along the first axis towards the center portion 123B of the LED board 123, a second distance d2 along the length dimension can be provided between the second and third rows of LED devices 125. A third distance d3 along the length dimension can be provided between the third and fourth rows of LED devices 125. A fourth distance d4 can be provided between the fourth and fifth rows of LED devices 125. A fifth distance d5 can be provided between the fifth and sixth rows of LED devices 125. A sixth distance d6 can be provided between the sixth and seventh rows of LED devices 125.

In some embodiments, d1 can be less than d2, which can be less than d3, which can be less than d4, which can be less than d5, which can be less than d6. In other embodiments, d1 can be about equal to d2, which can be about equal to d3, which can be less than d4, which can be less than d5, which can be less than d6. Other suitable variations in distance between LED devices 125 along the length dimension or other dimension of the LED board 123 can be provided without deviating from the scope of the present disclosure. In this way, the density of LED devices 125 on the LED board 123 can be increased in the peripheral portions 123A of the LED board 123 relative to the center portion 123 of the LED board 123.

FIG. 6 depicts on example distribution pattern for LED devices 125 on an LED board 123 to achieve varying densities of LED devices 125 at different portions of the LED board 123 according to example embodiments of the present disclosure. Those of ordinary skill in the art, using the disclosures provided herein, will understand that other patterns can be used to provide varying densities of LED devices 125 across the LED board 123 without deviating from the scope of the present disclosure.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A lighting fixture, comprising:

a housing;

one or more drivers; and a clamp bar attachable to the housing and positioned adjacent to the one or more drivers to decrease thermal resistance between the one or more drivers and the housing, wherein when the clamp bar is attached to the housing, the clamp bar exerts a force on the one or more drivers to increase a surface area of the one or more drivers in contact with the housing.

2. The lighting fixture of claim 1, wherein the clamp bar is positioned at least partially overlapping the one or more drivers.

3. The lighting fixture of claim 1, wherein the clamp bar comprises:

a base wall, and one or more end walls, wherein the base wall and the one or more end walls are configured to secure the one or more drivers to the housing.

4. The lighting fixture of claim 3, wherein the force exerted on the one or more of the drivers is created at least in part by the base wall of the clamp bar.

5. The lighting fixture of claim 1, wherein the one or more drivers comprise a plurality of drivers, and wherein the clamp bar further comprises one or more separators configured to physically separate one or more of the drivers.

6. The lighting fixture of claim 1, wherein the housing comprises a lower housing portion adjustably mounted to the housing such that the lower housing portion is movable between at least an open position and a closed position.

7. The lighting fixture of claim 6, wherein the clamp bar secures the one or more drivers to the lower housing portion.

8. The lighting fixture of claim 1, wherein the housing comprises a plurality of cooling fins.

9. The lighting fixture of claim 1, further comprising a light emitting diode (LED) system having one or more LED devices, and wherein the one or more LED devices are arranged on an LED board of a light engine.

10. The lighting fixture of claim 9, wherein the one or more LED devices are arranged on the LED board of the light engine such that a first portion of the LED board has a first density of LED devices and a second portion of the LED board has a second density of LED devices, the first density being different than the second density.

11. The lighting fixture of claim 10, wherein the first portion of the LED board is a peripheral portion of the LED board and the second portion of the LED board is a center portion of the LED board.

12. A lighting fixture, comprising:

a housing;

one or more drivers;

a clamp bar attachable to the housing and positioned adjacent to the one or more drivers to decrease thermal resistance between the one or more drivers and the housing; and an LED system comprising a light engine having a plurality of LED devices, the plurality of LED devices arranged on an LED board of the light engine such that a first portion of the LED board has a first density of LED devices and a second portion of the LED board has a second density of LED devices, the first density being different than the second density, wherein when the clamp bar is attached to the housing, the clamp bar exerts a force on the one or more drivers to increase a surface area of the one or more drivers in contact with the housing.

13. The lighting fixture of claim 12, the first portion of the LED board is a peripheral portion of the LED board and the second portion of the LED board is a center portion of the LED board.

14. The lighting fixture of claim 12, wherein a distance between rows of LED devices is varied along a long dimension of the LED board.

15. The lighting fixture of claim 14, wherein a distance between two rows of LED devices located in a center portion of the LED board is greater than distance between two rows of LED devices located in a peripheral portion of the LED board.

16. The lighting fixture of claim 12, wherein the housing-comprises a plurality of cooling fins.

17. The lighting fixture of claim 12, wherein the housing comprises a lower housing portion adjustably mounted to the housing such that the lower housing portion is movable between an open position and a closed position.

* * * * *